United States Patent
Jang et al.

(10) Patent No.: US 11,206,430 B2
(45) Date of Patent: Dec. 21, 2021

(54) SYNTAX DESIGN METHOD AND APPARATUS FOR PERFORMING CODING BY USING SYNTAX

(71) Applicant: LG ELECTRONICS INC., Seoul (KR)

(72) Inventors: Hyeongmoon Jang, Seoul (KR); Junghak Nam, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/219,184

(22) Filed: Mar. 31, 2021

(65) Prior Publication Data

US 2021/0219001 A1    Jul. 15, 2021

Related U.S. Application Data

(63) Continuation of application No. PCT/KR2019/013226, filed on Oct. 8, 2019.
(Continued)

(51) Int. Cl.
*H04N 19/70* (2014.01)
*H04N 19/176* (2014.01)
*H04N 19/52* (2014.01)

(52) U.S. Cl.
CPC ........... *H04N 19/70* (2014.11); *H04N 19/176* (2014.11); *H04N 19/52* (2014.11)

(58) Field of Classification Search
None
See application file for complete search history.

(56) References Cited

U.S. PATENT DOCUMENTS 9,438,910 B1    9/2016  Han et al.
11,012,687 B2 *  5/2021  Li ..................... H04N 19/105

FOREIGN PATENT DOCUMENTS

KR         101003105 B1    12/2010
KR       20130121766 A    11/2013
(Continued)

OTHER PUBLICATIONS

Benjamin Bross, et al., "Versatile Video Coding (Draft 2)", Joint Video Experts Team (JVET) of ITU-T SG 16 WP 3 and ISO/IEC JTC 1/SC 29/WG 11, 11th Meeting; Ljubljana, SI, Jul. 10-18, 2018. JVET-K1001-v7.
(Continued)

*Primary Examiner* — Lindsay J Uhl
(74) *Attorney, Agent, or Firm* — Dentons US LLP

(57) ABSTRACT

An image decoding method performed by a decoding apparatus according to the present disclosure comprises the steps of: decoding, on the basis of a bitstream, an affine flag that indicates whether affine prediction is applicable to a current block and a sub-block TMVP flag that indicates whether a temporal motion vector predictor based on a sub-block of the current block is usable; determining whether to decode a predetermined merge mode flag that indicates whether to apply a predetermined merge mode to the current block, on the basis of the decoded affine flag and the decoded sub-block TMVP flag; deriving prediction samples of the current block on the basis of the determining of whether to decode the predetermined merge mode flag; and generating reconstructed samples of the current block based on the prediction samples of the current block.

20 Claims, 8 Drawing Sheets

Related U.S. Application Data

(60) Provisional application No. 62/742,456, filed on Oct. 8, 2018.

(56) References Cited

FOREIGN PATENT DOCUMENTS

KR      20180098703 A    9/2018
WO      2018061563 A1    4/2018

OTHER PUBLICATIONS

Benjamin Bross, et al., "Versatile Video Coding (Draft 2)", Joint Video Experts Team (JVET) of ITU-T SG 16 WP 3 and IS 0/IEC JTC 1/SC 29/WG 11, 11th Meeting: Ljubljana, SI, Jul. 10-18, 2018. JVET-K1001-v6.

Fandong Chen, et al., "Non-CE4: Remove the Redundancy among Flag coding for Merge Mode", Joint Video Experts Team (JVET) of ITU-T SG 16 WP 3 and ISO/IEC JTC 1/SC 29/WG 11, 15th Meeting: Gothenberg, SE, Jul. 3-12, 2019. JVET-00361-v4.

* cited by examiner

Encoding apparatus

Decoding apparatus

SYNTAX DESIGN METHOD AND APPARATUS FOR PERFORMING CODING BY USING SYNTAX

CROSS-REFERENCE TO RELATED APPLICATIONS

Pursuant to 35 U.S.C. § 119(e), this application is a continuation of International Application PCT/KR2019/013226, with an international filing date of Oct. 8, 2019, which claims the benefit of U.S. Provisional Patent Application No. 62/742,456, filed on Oct. 8, 2018, the contents of which are hereby incorporated by reference herein in its entirety.

BACKGROUND OF THE DISCLOSURE

Field of the Disclosure

The present disclosure relates to an image coding technology and, more particularly, to a syntax design method and an apparatus for performing coding using syntax in an image coding system.

Related Art

Recently, the demand for high resolution, high quality image/video such as 4K or 8K Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

One technical object of the present disclosure is to provide a method and apparatus for improving image coding efficiency.

Another technical object of the present disclosure is to provide a syntax design method and an apparatus for performing coding using syntax.

Yet another technical object of the present disclosure is to provide a method for designing high level syntax and low level syntax and an apparatus for performing coding using syntax.

Still another technical object of the present disclosure is to provide a method and apparatus for using high level and/or low level syntax elements for performing motion prediction based on sub-blocks.

Yet still another technical object of the present disclosure is to provide a method and apparatus for using high level and/or low level syntax elements for performing motion prediction based on an affine model.

Still yet another technical object of the present disclosure is to provide a method and apparatus for determining, based on an affine flag and a sub-block TMVP flag, whether to decode a predetermined mode flag indicating whether to apply a predetermined merge mode to a current block.

According to one embodiment of the present disclosure, an image decoding method performed by a decoding apparatus is provided. The method comprises decoding, based on a bitstream, an affine flag indicating applicability of affine prediction to a current block and a sub-block TMVP flag indicating availability of a temporal motion vector predictor based on a sub-block of the current block; determining, based on the decoded affine flag and the decoded sub-block TMVP flag, whether to decode a predetermined merge mode flag indicating whether to apply a predetermined merge mode to the current block; deriving prediction samples for the current block based on the determination about whether to decode the predetermined merge mode flag; and generating reconstructed samples for the current block based on the prediction samples for the current block, wherein, when the value of the affine flag is 1 or the value of the sub-block TMVP flag is 1, it is determined to decode the predetermined merge mode flag.

According to another embodiment of the present disclosure, a decoding apparatus performing image decoding is provided. The decoding apparatus comprises an entropy decoder decoding, based on a bitstream, an affine flag indicating applicability of affine prediction to a current block and a sub-block TMVP flag indicating availability of a temporal motion vector predictor based on a sub-block of the current block; and determining, based on the decoded affine flag and the decoded sub-block TMVP flag, whether to decode a predetermined merge mode flag indicating whether to apply a predetermined merge mode to the current block; a predictor deriving prediction samples for the current block based on the determination about whether to decode the predetermined merge mode flag; and an adder generating reconstructed samples for the current block based on the prediction samples for the current block, wherein, when the value of the affine flag is 1 or the value of the sub-block TMVP flag is 1, it is determined to decode the predetermined merge mode flag.

According to yet another embodiment of the present disclosure, an image encoding method performed by an encoding apparatus is provided. The method comprises determining applicability of affine prediction to a current block and availability of a temporal motion vector predictor based on a sub-block of the current block; determining, based on the determination about applicability of the affine prediction to the current block and availability of the temporal motion vector predictor based on the sub-block of the current block, whether to encode a predetermined merge mode flag indicating whether to apply a predetermined merge mode to the current block; and encoding, based on the determination about whether to encode the predetermined merge mode flag, an affine flag indicating applicability of the affine prediction to the current block, a sub-block TMVP flag indicating availability of the temporal motion vector predictor based on the sub-block of the current block, and the predetermined merge mode flag, wherein, when the value of the affine flag is 1 or the value of the sub-block TMVP flag is 1, it is determined to encode the predetermined merge mode flag.

According to still another embodiment of the present disclosure, an encoding apparatus performing image encoding is provided. The encoding apparatus comprises a predictor determining applicability of affine prediction to a current block and availability of a temporal motion vector predictor based on a sub-block of the current block; and determining, based on the determination about applicability of the affine prediction to the current block and availability of the temporal motion vector predictor based on the sub-block of the current block, whether to encode a predetermined merge mode flag indicating whether to apply a predetermined merge mode to the current block, and an entropy encoder encoding, based on the determination about whether to encode the predetermined merge mode flag, an affine flag indicating applicability of the affine prediction to the current block, a sub-block TMVP flag indicating availability of the temporal motion vector predictor based on the sub-block of the current block, and the predetermined merge mode flag, wherein, when the value of the affine flag is 1 or the value of the sub-block TMVP flag is 1, it is determined to encode the predetermined merge mode flag.

According to yet still another embodiment of the present disclosure, a decoder-readable storage medium is provided, which stores information on the instructions causing a video decoding apparatus to perform decoding methods according to part of the embodiments.

According to still yet another embodiment of the present disclosure, a decoder-readable storage medium is provided, which stores information on the instructions causing a video decoding apparatus to perform decoding methods according to one of the embodiments. The decoding method according to one embodiment comprises decoding, based on a bitstream, an affine flag indicating applicability of affine prediction to a current block and a sub-block TMVP flag indicating availability of a temporal motion vector predictor based on a sub-block of the current block; determining, based on the decoded affine flag and the decoded sub-block TMVP flag, whether to decode a predetermined merge mode flag indicating whether to apply a predetermined merge mode to the current block; deriving prediction samples for the current block based on the determination about whether to decode the predetermined merge mode flag; and generating reconstructed samples for the current block based on the prediction samples for the current block, wherein, when the value of the affine flag is 1 or the value of the sub-block TMVP flag is 1, it is determined to decode the predetermined merge mode flag.

Advantageous Effects

According to the present disclosure, the overall image/video compression efficiency may be improved.

According to the present disclosure, image coding efficiency may be improved through a high level syntax and low level syntax design.

According to the present disclosure, image coding efficiency may be improved using high level and/or low level syntax elements for performing motion prediction based on sub-blocks.

According to the present disclosure, image coding efficiency may be improved using high level and/or low level syntax elements for performing motion prediction based on an affine model.

According to the present disclosure, image coding efficiency may be improved by determining, based on an affine flag and a sub-block TMVP flag, whether to decode a predetermined merge mode flag indicating whether to apply a predetermined merge mode to a current block.

DESCRIPTION OF EXEMPLARY EMBODIMENTS

Figure 1:
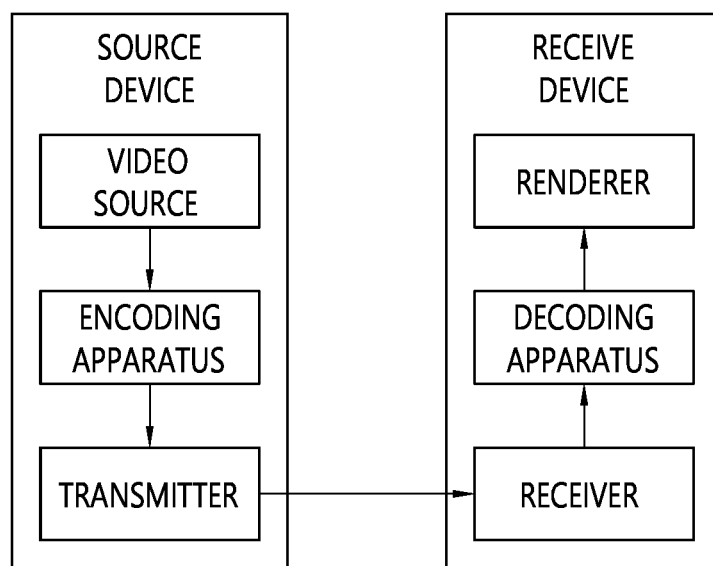
FIG. 1 illustrates an example of a video/image coding system to which the present disclosure may be applied.

According to one embodiment of the present disclosure, an image decoding method performed by a decoding apparatus is provided. The method comprises decoding, based on a bitstream, an affine flag indicating applicability of affine prediction to a current block and a sub-block TMVP flag indicating availability of a temporal motion vector predictor based on a sub-block of the current block; determining, based on the decoded affine flag and the decoded sub-block TMVP flag, whether to decode a predetermined merge mode flag indicating whether to apply a predetermined merge mode to the current block; deriving prediction samples for the current block based on the determination about whether to decode the predetermined merge mode flag; and generating reconstructed samples for the current block based on the prediction samples for the current block, wherein, when the value of the affine flag is 1 or the value of the sub-block TMVP flag is 1, it is determined to decode the predetermined merge mode flag.

This disclosure may be modified in various forms, and specific embodiments thereof will be described and shown in the drawings. However, the embodiments are not intended for limiting this disclosure. The terms used in the following description are used to merely describe specific embodiments, but are not intended to limit this disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, each of the components in the drawings described in this disclosure are shown independently for the convenience of description regarding different characteristic functions, and do not mean that the components are implemented in separate hardware or separate software. For example, two or more of each configuration may be combined to form one configuration, or one configuration may be divided into a plurality of configurations. Embodiments in which each configuration is integrated and/or separated are also included in the scope of this disclosure without departing from the spirit of this disclosure.

Hereinafter, exemplary embodiments of this disclosure will be described in detail with reference to the accompanying drawings. Hereinafter, the same reference numerals are used for the same components in the drawings, and redundant description of the same components may be omitted.

FIG. 1 is schematically illustrating a video/image coding system to which this disclosure may be applied.

Referring to FIG. 1, a video/image coding system may include a first apparatus (a source device) and a second apparatus (a receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, the methods/embodiments disclosed in this document may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

This document presents various embodiments of video/image coding, and the embodiments may be performed in combination with each other unless otherwise mentioned.

In this document, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either the number of complete tiles or only a consecutive sequence of complete bricks of one tile. Tile groups and slices may be used interchangeably in this document. For example, in this document, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex., Cb, cr) blocks. The unit may be used interchangeably with terms such as block or area in some cases. In a general case, an M×N block may include samples (or sample arrays) or a set (or array) of transform coefficients of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 2:
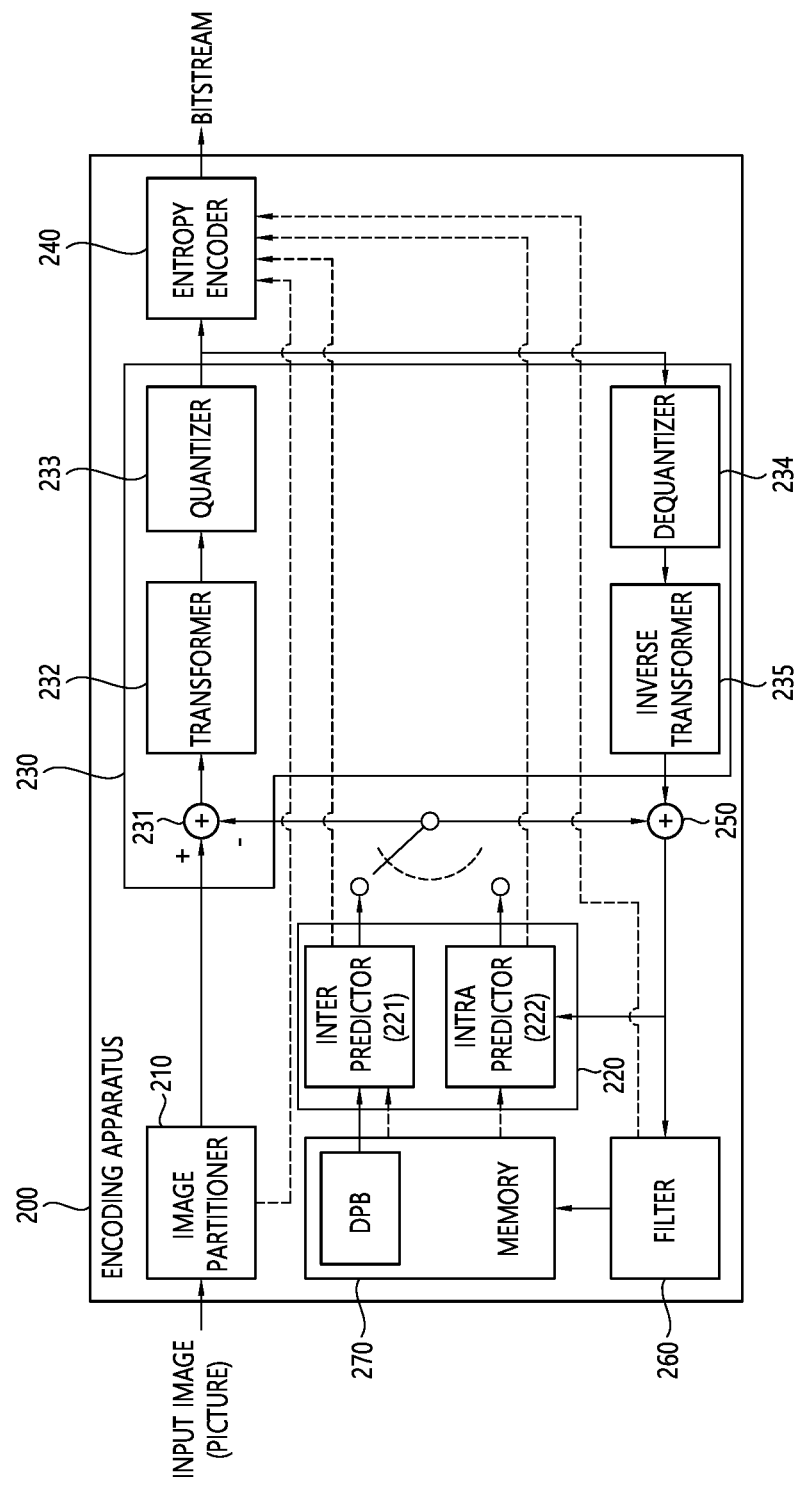
FIG. 2 illustrates a configuration of a video/image encoding apparatus to which the present disclosure may be applied.

FIG. 2 is a schematic diagram illustrating a configuration of a video/image encoding apparatus to which the embodiments of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various kinds of information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. Encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various kinds of information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
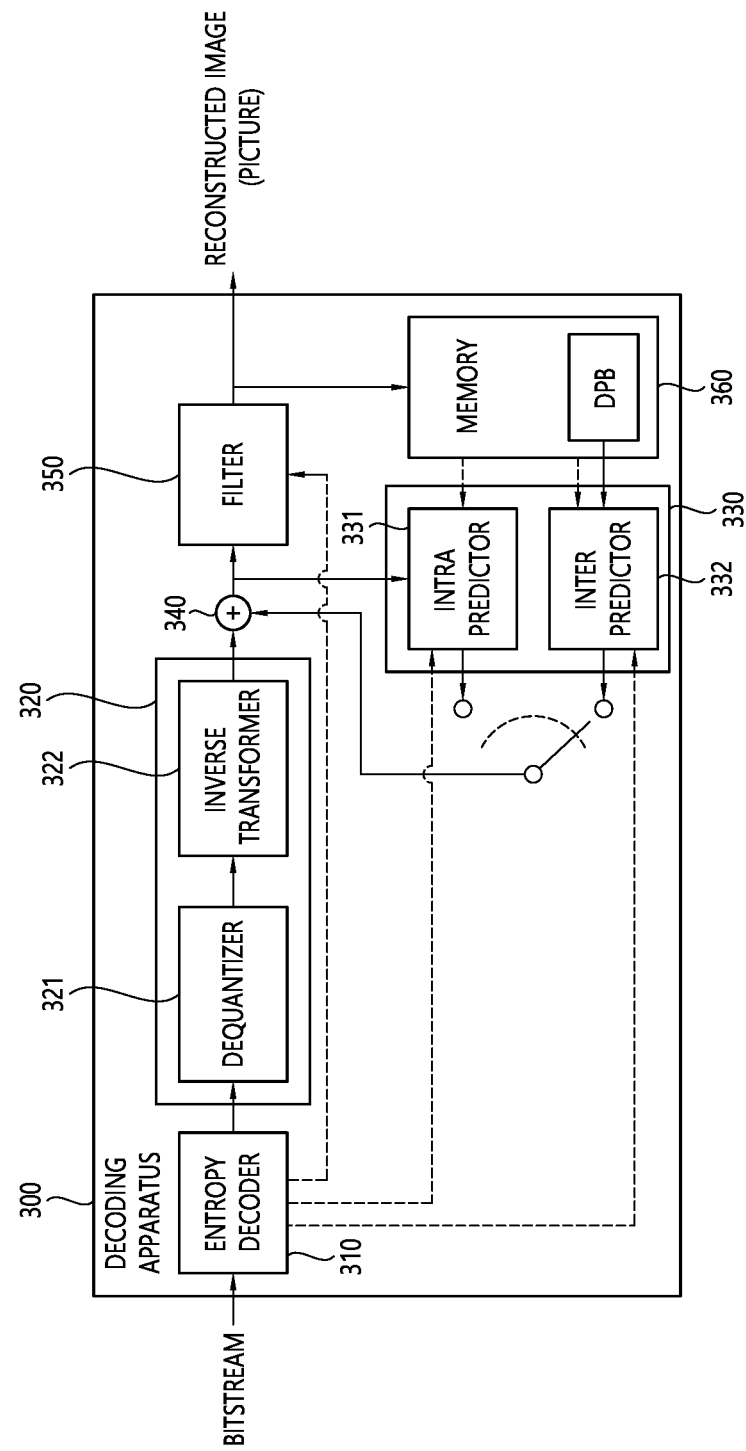
FIG. 3 illustrates a configuration of a video/image decoding apparatus to which the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block. The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, a prediction is performed to enhance compression efficiency. A predicted block including prediction samples for a current block, that is, a target coding block, may be generated through the prediction. In this case, the predicted block includes the prediction samples in a spatial domain (or pixel domain). The predicted block is identically derived in the encoding apparatus and the decoding apparatus. The encoding apparatus may enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

In one embodiment, to control sub-block based motion prediction, a sub-block TMVP flag indicating availability of a temporal motion vector predictor based on a sub-block may be used. The sub-block TMVP flag may be signaled at a Sequence Parameter Set (SPS) level and may control the on/off of sub-block based motion prediction. The sub-block TMVP flag may be referred to as sps_sbtmvp_enabled_flag as shown in Table 1 below.

Also, to control an affine motion prediction method, an affine flag indicating applicability of affine prediction to a current block may be used. The affine flag may be signaled at the SPS level and may control the on/off of affine prediction. The affine flag may be referred to as sps_affine_enabled_flag as shown in Table 1 below. When the value of the affine flag is 1, availability of 6 parameter affine prediction may be determined by additionally signaling an affine-type flag.

One example of syntax signaled at the SPS level is shown in Table 1 below.

TABLE 1

|  | Descriptor |
|---|---|
| seq_parameter_set_rbsp( ) { |  |
|   sps_seq_parameter_set_id | ue(v) |
|   chroma_format_idc | ue(v) |
|   if( chroma_format_idc = = 3 ) |  |
|     separate_colour_plane_flag | u(1) |
|   pic_width_in_luma_samples | ue(v) |
|   pic_height_in_luma_samples | ue(v) |
|   bit_depth_luma_minus8 | ue(v) |
|   bit_depth_chroma_minus8 | ue(v) |
|   qtbtt_dual_tree_intra_flag | ue(v) |
|   log2_ctu_size_minus2 | ue(v) |
|   log2_min_qt_size_intra_slices_minus2 | ue(v) |
|   log2_min_qt_size_inter_slices_minus2 | ue(v) |

TABLE 1-continued

|  | Descriptor |
|---|---|
|   max_mtt_hierarchy_depth_inter_slices | ue(v) |
|   max_mtt_hierarchy_depth_intra_slices | ue(v) |
|   sps_cclm_enabled_flag | u(1) |
|   sps_alf_enabled_flag | u(1) |
|   sps_temporal_mvp_enabled_flag | u(1) |
|   if( sps_temporal_mvp_enabled_flag ) |  |
|     sps_sbtmvp_enabled_flag | u(1) |
|   if( sps_sbtmvp_enabled_flag ) |  |
|     log2_sbtmvp_default_size_minus2 | u(1) |
|   sps_amvr_enabled_flag | u(1) |
|   sps_affine_enabled_flag | u(1) |
|   if( sps_affine_enabled_flag ) |  |
|     sps_affine_type_flag | u(1) |
|   sps_mts_intra_enabled_flag | u(1) |
|   sps_mts_inter_enabled_flag | u(1) |
|   rbsp_trailing_bits( ) |  |
| } |  |

In one embodiment, according to low level coding syntax, as shown in Table 2 below, if merge_flag of a current block (coding unit) is 1, a flag (for example, a merge affine flag) for indicating whether affine merge or normal merge is applied to the current block may be signaled based on a condition (for example, a block size or a block shape) of the current block. The merge affine flag may be denoted by merge_affine_flag, for example. In one example, when the value of the affine flag signaled at the SPS level is 0 and the value of merge_flag signaled at a coding unit level is 1, it may be determined without signaling of an additional syntax element that normal merge is applied to the current block.

One example of syntax signaled at the coding unit level is shown in Table 2 below.

TABLE 2

|  | Descriptor |
|---|---|
| coding_unit( x0, y0, cbWidth, cbHeight, treeType) { |  |
|   if( slice_type != I) { |  |
|     cu_skip_flag[ x0 ][ y0 ] | ae(v) |
|     if( cu_skip_flag[ x0 ][ y0 ] == 0 ) |  |
|       pred_mode_flag | ae(v) |
|   } |  |
|   if( CuPredMode[ x0 ][ y0 ] == MODE_INTRA ) { |  |
|     if( treeType == SINGLE_TREE | | treeType == DUAL_TREE_LUMA ) { |  |
|       intra_luma_mpm_flag[ x0 ][ y0 ] | ae(v) |
|       if( intra_luma_mpm_flag[ x0 ][ y0 ] ) |  |
|         intra_luma_mpm_idx[ x0 ][ y0 ] | ae(v) |
|       else |  |
|         intra_luma_mpm_remainder[ x0 ][ y0 ] | ae(v) |
|     } |  |
|     if( treeType == SINGLE_TREE | | treeType == DUAL_TREE_CHROMA ) |  |
|       intra_chroma_pred_mode[ x0 ][ y0 ] | ae(v) |
|   } else { /* MODE _INTER */ |  |
|     if( cu_skip_flag[ x0 ][ y0 ] ) { |  |
|       if( sps_affine_enabled_flag && cbWidth >= 8 && cbHeight >= 8 ) |  |
|         merge_affine_flag[ x0 ][ y0 ] | ae(v) |
|       if( merge_affine_flag[ x0 ][ y0 ] == 0 && MaxNumMergeCand > 1 ) |  |
|         merge_idx[ x0 ][ y0 ] | ae(v) |
|       if( merge_affine_flag[ x0 ][ y0 ] == 1 && MaxNumAffineMergeCand > 1 ) |  |
|         merge_affine_idx[ x0 ][ y0 ] | ae(v) |
|     } else { |  |
|       merge_flag[ x0 ][ y0 ] | ae(v) |
|       if( merge_flag[ x0 ][ y0 ] ) { |  |
|         if( sps_affine_enabled_flag && cbWidth >= 8 && cbHeight >= 8) |  |
|           merge_affine_flag[ x0 ][ y0 ] | ae(v) |
|         if( merge_affine_flag[ x0 ][ y0 ] == 0 && MaxNumMergeCand > 1 ) |  |
|           merge_idx[ x0 ][ y0 ] | ae(v) |
|         if( merge_affine_flag[ x0 ][ y0 ] == 1 && MaxNumAffineMergeCand > 1 |  |

TABLE 2-continued

| | Descriptor |
|---|---|
|       merge_affine_idx[ x0 ][ y0 ]<br>    } else {<br>      if( slice_type == B )<br>        inter_pred_idc[ x0 ][ y0 ]<br>      if( sps_affine_enabled_flag && cbWidth >= 16 && cbHeight >= 16 ) {<br>        inter_affine_flag[ x0 ][ y0 ]<br>        if( sps_affine_type_flag && inter_affine_flag[ x0 ][ y0 ] )<br>          cu_affine_type_flag[ x0 ][ y0 ]<br>      }<br>      if( inter_pred_idc[ x0 ][ y0 ] != PRED_L1 ) {<br>        if( num_ref_idx_l0_active_minus1 > 0 )<br>          ref_idx_l0[ x0 ][ y0 ]<br>        mvd_coding( x0, y0, 0, 0 )<br>        if( MotionModelIdc[ x0 ][ y0 ] > 0 )<br>          mvd_coding( x0, y0, 0, 1 )<br>        if(MotionModelIdc[ x0 ][ y0 ] > 1 )<br>          mvd_coding( x0, y0, 0, 2 )<br>        mvp_l0_flag[ x0 ][ y0 ]<br>      } else {<br>        MvdL0[ x0 ][ y0 ][ 0 ] = 0<br>        MvdL0[ x0 ][ y0 ][ 1 ] = 0<br>      }<br>      if( inter_pred_idc[ x0 ][ y0 ] != PRED_L0 ) {<br>        if( num_ref_idx_l1_active_minus1 > 0 )<br>          ref_idx_l1[ x0 ][ y0 ]<br>        if( mvd_l1_zero_flag && inter_pred_idc[ x0 ][ y0 ] == PRED_BI ) {<br>          MvdL1[ x0 ][ y0 ][ 0 ] = 0<br>          MvdL1[ x0 ][ y0 ][ 1 ] = 0<br>          MvdCpL1[ x0 ][ y0 ][ 0 ][ 0 ] = 0<br>          MvdCpL1[ x0 ][ y0 ][ 0 ][ 1 ] = 0<br>          MvdCpL1[ x0 ][ y0 ][ 1 ][ 0 ] = 0<br>          MvdCpL1[ x0 ][ y0 ][ 1 ][ 1 ] = 0<br>          MvdCpL1[ x0 ][ y0 ][ 2 ][ 0 ] = 0<br>          MvdCpL1[ x0 ][ y0 ][ 2 ][ 1 ] = 0<br>        } else {<br>          mvd_coding( x0, y0, 1, 0 )<br>          if( MotionModelIdc[ x0 ][ y0 ] > 0 )<br>            mvd_coding( x0, y0, 1, 1 )<br>          if(MotionModelIdc[ x0 ][ y0 ] > 1 )<br>            mvd_coding( x0, y0, 1, 2 )<br>          mvp_l1_flag[ x0 ][ y0 ]<br>        } else {<br>          MvdL1[ x0 ][ y0 ][ 0 ] = 0<br>          MvdL1[ x0 ][ y0 ][ 0 ] = 0<br>        }<br>        if( sps_amvr_enabled_flag && inter_affine_flag == 0 &&<br>          ( MvdL0[ x0 ][ y0 ][ 0 ] != 0 \|\| MvdL0[ x0 ][ y0 ][ 1 ] != 0 \|\|<br>          MvdL1[ x0 ][ y0 ][ 0 ] != 0 \|\| MvdL1[ x0 ][ y0 ][ 0 ] != 0 ) )<br>          amvr_mode[ x0 ][ y0 ]<br>      }<br>    }<br>  }<br>  if( CuPredMode[ x0 ][ y0 ] != MODE_INTRA && cu_skip_flag[ x0 ][ y0 ]<br>== =<br>0 )<br>    cu_cbf<br>  if( cu_cbf ) {<br>    transform_tree( x0, y0, cbWidth, cbHeight, treeType )<br>} | ae(v)<br><br>ae(v)<br><br>ae(v)<br><br>ae(v)<br><br><br>ae(v)<br><br><br><br><br><br>ae(v)<br><br><br>ae(v)<br><br><br><br><br><br><br><br><br><br><br><br><br><br>ae(v)<br><br><br><br><br><br>ae(v)<br><br><br><br><br>ae(v) |

Meanwhile, when the high level syntax design of Table 1 and the low level syntax design of Table 2 are applied, a design problem, a logical problem, and a conceptual problem may occur if ATMVP is used as an affine merge candidate. In one example, when the value of the affine flag signaled at the SPS level is 0 and the value of the sub-block TMVP flag signaled at the SPS level is 1, an ATMVP candidate may not be used as a candidate at all even though signaling indicates that ATMVP is available at the SPS level. In addition to the design problem and the logical problem above, a conceptual problem may exist. ATMVP is a motion prediction method based on sub-blocks (in one example, SubPu); one purpose of ATMVP is to determine whether merge of a current block is a sub-block merge or a non-sub block merge by using a motion prediction candidate as a candidate of the affine merge mode performing sub-block based prediction to distinguish a non-sub block based (in one example, non-SubPu based) motion prediction candidate from a sub-block based motion prediction candidate in the normal merge. However, despite the purpose, the low level syntax design according to Table 2 above shows that sub-block ATMVP is controlled according to whether affine merge is used.

To supplement the design problem, the logical problem, and the conceptual problem, in one embodiment, a high level and/or low level syntax design may be provided based on at least one of Tables 3 to 11 below.

In one embodiment, a flag for controlling sub-block based motion prediction may be signaled at the SPS level. The flag for controlling sub-block based motion prediction may be denoted by sps_subpumvp_enabled_flag and may be used to determine the on/off of the sub-block based motion prediction. When the value of the sps_subpumvp_enabled_flag is 1, affine_enabled_flag and sbtmvp_enabled_flag may be signaled as shown in Table 3 below.

TABLE 3

| | Descriptor |
|---|---|
| seq_parameter_set_rbsp( ) { | |
|   sps_temporal_mvp_enabled_flag | u(1) |
|   sps_subpumvp_enabled_flag | u(1) |
|   if(sps_subpumvp_enabled_flag) { | |
|     if( sps_temporal_mvp_enabled_flag ) | |
|       sps_sbtmvp_enabled_flag | u(1) |
|     if( sps_sbtmvp_enabled_flag ) | |
|       log2_sbtmvp_default_size_minus2 | u(1) |
|     sps_affine_enabled_flag | u(1) |
|     if( sps_affine_enabled_flag ) | |
|       sps_affine_type_flag | u(1) |
| } | |

When the SPS level syntax design of Table 3 is used, availability of affine prediction and ATMVP may be determined as shown in Table 4 below. In Table 4, 1 indicates that the corresponding method is available while 0 indicates that the corresponding method is unavailable.

TABLE 4

| | Affine | ATMVP |
|---|---|---|
| On/off | 0 | 1 |
| | 1 | 1 |
| | 0 | 0 |

In one embodiment, a high level syntax design for controlling both of affine prediction and ATMVP based on sps_subpumvp_enabled_flag may be provided. According to the present embodiment, if the value of sps_subpumvp_enabled_flag is 1, it may be determined that both of the affine prediction and the ATMVP are available. The high level syntax design according to the present embodiment may be as shown in Table 5 below.

TABLE 5

| | Descriptor |
|---|---|
| seq_parameter_set_rbsp( ) { | |
|   sps_temporal_mvp_enabled_flag | u(1) |
|   sps_subpumvp_enabled_flag | u(1) |
|   if(sps_subpumvp_enabled_flag) { | |
|     log2_sbtmvp_default_size_minus2 | u(1) |
|     sps_affine_type_flag | u(1) |
| } | |

In one embodiment, according to Table 5, a method for using slice_subpumvp_enabled_flag in the slice header syntax to specifically control availability of ATMVP even in each slice unit as well as controlling both of the affine prediction and the ATMVP based on sps_subpumvp_enabled_flag included in the high level syntax may be provided. The syntax at the slice header level according to the present embodiment may be as shown in Table 6 below.

TABLE 6

| | Descriptor |
|---|---|
| slice_header( ) { | |
|   if( sps_temporal_mvp_enabled_flag ){ | |
|     slice_temporal_mvp_enabled_flag | u(1) |
|     if(sps_subpumvp_enabled_flag) | |
|       slice_subpumvp_enabled_flag | u(1) |
| } | |

In one embodiment, when an affine prediction method is not used and sps_sbtmvp_enabled_flag is 1, a method may be provided, which signals merge_affine_flag and configures motion candidates using only ATMVP candidates but not including affine candidates. An example of low level syntax illustrating the present embodiment is shown in Table 7 below.

TABLE 7

| | Descriptor |
|---|---|
| coding_unit( x0, y0, cbWidth, cbHeight, treeType ) { | |
| ...... | |
|   merge_flag[ x0 ][ y0 ] | ae(v) |
|   if( merge_flag[ x0 ][ y0 ] ) { | |
|     if( (sps_affine_enabled_flag && cbWidth >= 8 && cbHeight >= 8) \|\| sps_sbtmvp_enabled_flag) | |
|       merge_affine_flag[ x0 ][ y0 ] | ae(v) |
|     if( merge_affine_flag[ x0 ][ y0 ] == 0 && MaxNumMergeCand > 1 ) | |
|       merge_idx[ x0 ][ y0 ] | ae(v) |
|     if( merge_affine_flag[ x0 ][ y0 ] == 1 && MaxNumAffineMergeCand > 1 && (sps_affine_enabled_flag && cbWidth >= 8 && cbHeight >= 8) ) | |
|       merge_affine_idx[ x0 ][ y0 ] | ae(v) |
| } | |

In Table 7, when the value of sps_affine_enabled_flag is 1 or the value of sps_sbtmvp_enabled_flag is 1, it may be determined to decode merge_affine_flag that indicates whether to apply a merge affine mode.

In one embodiment, when the value of sps_affine_enabled_flag is 1 or the value of sps_sbtmvp_enabled_flag is 1, it may be determined to decode a merge sub-block flag (merge_subblock_flag) indicating whether to apply a merge sub-block mode. In the merge sub-block mode, a merge candidate may be determined in units of sub-blocks.

In Table 7, when the width (cbWidth) and the height (cbHeight) of a current block are larger than or equal to 8, respectively, and the value of sps_affine_enabled_flag is 1, or the value of sps_sbtmvp_enabled_flag is 1, it may be determined to decode a merge affine flag (merge_affine_flag).

In one embodiment, when the maximum number of merge candidates of the sub-block of the current block is larger than 0, it may be determined to decode the predetermined merge mode flag.

In one embodiment, when the value of the affine flag is 1 or the value of the sub-block TMVP flag is 1, the maximum number of merge candidates of the sub-block of the current block may be larger than 0.

In one embodiment, whether to decode the predetermined merge mode flag may be determined based on whether the statement if (MaxNumSubblockMergeCand>0 && cbWidth>=8 && cbHeight>=8) is satisfied. MaxNumSubblockMergeCand may represent the maximum number of merge candidates of the sub-block, the cbWidth may represent the width of the current block, and the cbHeight may represent the height of the current block.

In Table 7, when the value of sps_affine_enabled_flag is 0 and the value of sps_sbtmvp_enabled_flag is 1, merge_affine_idx may not be signaled but may be inferred to be 0. According to the embodiment of Table 7, availability of affine prediction and ATMVP may be determined as shown in Table 8.

TABLE 8

|  | Affine | ATMVP |
|---|---|---|
| On/off | 1 | 0 |
|  | 1 | 1 |
|  | 0 | 0 |
|  | 0 | 1 |

In one embodiment, when the affine prediction is not used and the value of sps_sbtmvp_enabled_flag is 1, a method for controlling ATMVP to be used as a normal merge candidate may be provided. According to the present embodiment, availability of affine prediction and ATMVP may be determined as shown in Table 9 below.

TABLE 9

|  | Affine | ATMVP |
|---|---|---|
| On/off | 1 | 0 |
|  | 1 | 1 |
|  | 0 | 0 |
|  | 0 | 1 (for Normal Merge) |

In one embodiment, a method for designing high level syntax that signals sps_sbtmvp_enabled_flag only when the value of affine_enabled_flag is 1 may be provided. This method may be intended to consider a structure of a low level coding tool designed so that ATMVP is used as an affine merge candidate and ATMVP is not used when the value of sps_affine_enabled_flag is 0. An example of high level syntax according to the present embodiment is shown in Table 10 below.

TABLE 10

| | Descriptor |
|---|---|
| seq_parameter_set_rbsp( ) { | |
|   sps_temporal_mvp_enabled_flag | u(1) |
|   sps_affine_enabled_flag | u(1) |
|   if( sps_affine_enabled_flag ) { | |
|     sps_affine_type_flag | u(1) |
|     if( sps_temporal_mvp_enabled_flag ) | |
|       sps_sbtmvp_enabled_flag | u(1) |
|     if( sps_sbtmvp_enabled_flag ) | |
|       log2_sbtmvp_default_size_minus2 | u(1) |
| } | |

When the SPS level syntax design of Table 10 is used, availability of affine prediction and ATMVP may be determined as shown in Table 11.

TABLE 11

|  | Affine | ATMVP |
|---|---|---|
| On/off | 1 | 0 |
|  | 1 | 1 |
|  | 0 | 0 |

Figure 4:
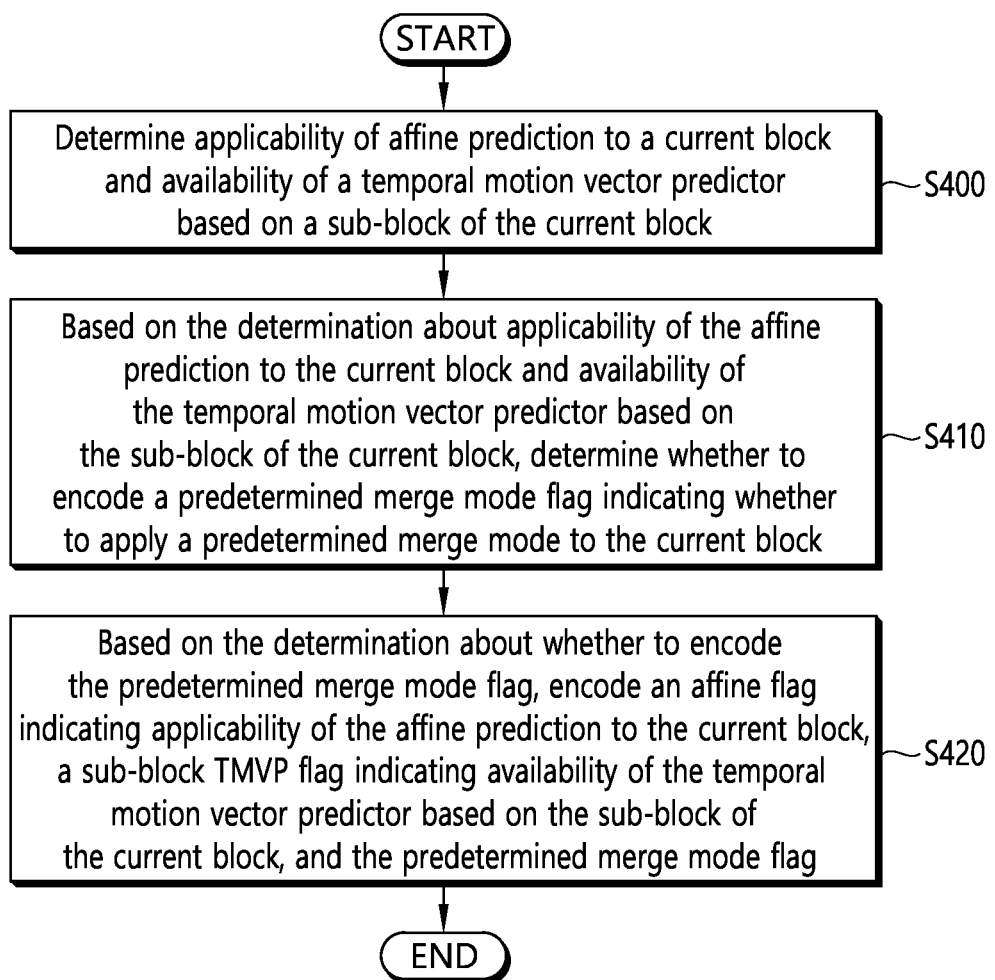
FIG. 4 is a flow diagram illustrating an operation of an encoding apparatus according to one embodiment.
Figure 5:
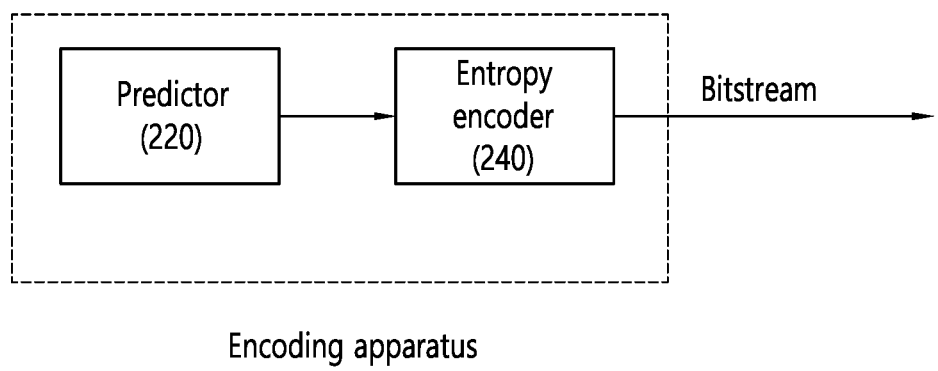
FIG. 5 illustrates a configuration of an encoding apparatus according to one embodiment.

FIG. 4 is a flow diagram illustrating an operation of an encoding apparatus according to one embodiment, and FIG. 5 illustrates a configuration of an encoding apparatus according to one embodiment.

Figure 6:
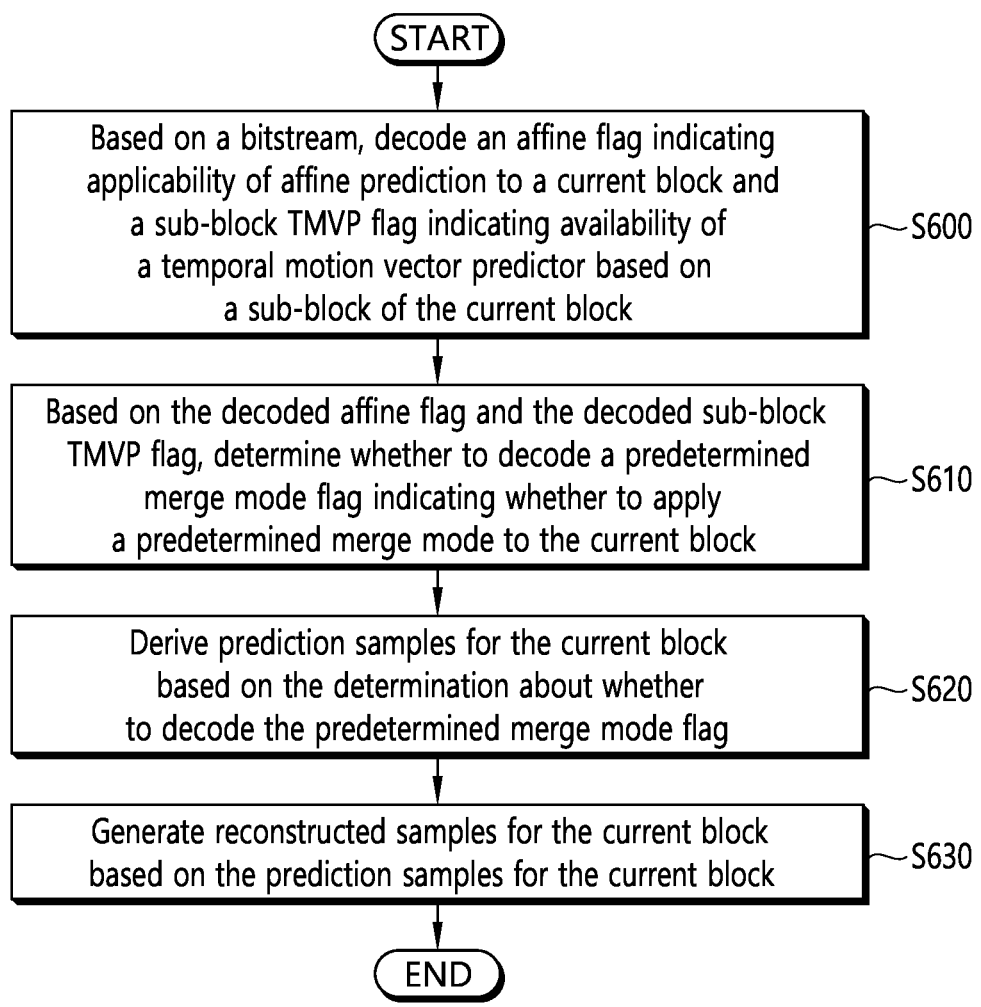
FIG. 6 is a flow diagram illustrating an operation of a decoding apparatus according to one embodiment.
Figure 7:
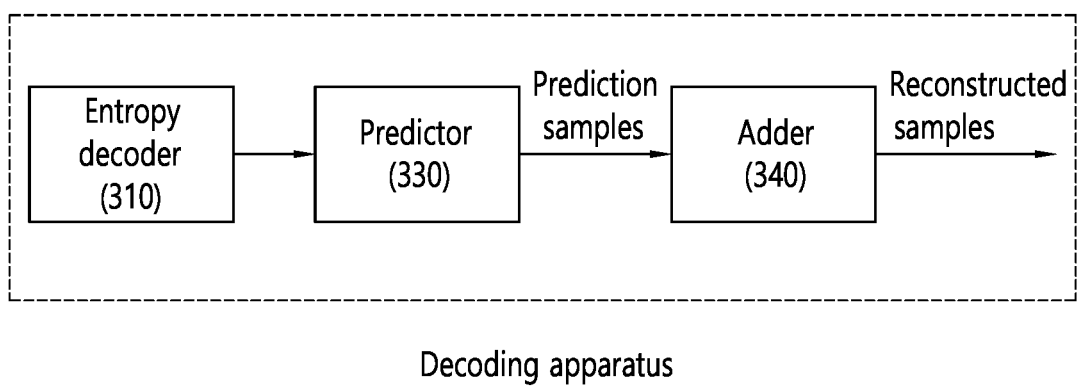
FIG. 7 illustrates a configuration of a decoding apparatus according to one embodiment.

The encoding apparatus according to FIGS. 4 and 5 may perform the operations corresponding to the decoding apparatus according to FIGS. 6 and 7. Therefore, the operations of the decoding apparatus to be described with reference to FIGS. 6 and 7 may be applied in the same way to the encoding apparatus according to FIGS. 4 and 5.

The respective steps shown in FIG. 4 may be performed by the encoding apparatus 200 shown in FIG. 2. More specifically, S400 to S410 steps may be performed by the predictor 220 disclosed in FIG. 2, and S420 step may be performed by the entropy encoder 240 disclosed in FIG. 2. Moreover, the operations according to the S400 to S420 steps are based on part of the descriptions given with reference to FIG. 3. Therefore, specific descriptions overlapping the details described with reference to FIGS. 2 and 3 will be omitted or simplified.

As shown in FIG. 5, an encoding apparatus according to one embodiment may include a predictor 220 and an entropy encoder 240. However, depending on situations, not all of the constituting elements shown in FIG. 5 may be essential elements of the encoding apparatus, and the encoding apparatus may be implemented using a larger or smaller number of constituting elements than those shown in FIG. 5.

In the encoding apparatus according to one embodiment, the predictor 220 and the entropy encoder 240 may be implemented by the respective chips, or at least two or more constituting elements may be implemented using a single chip.

The encoding apparatus according to one embodiment may determine applicability of affine prediction to a current block and availability of a temporal motion vector predictor based on a sub-block of the current block S400. More specifically, the predictor 220 of the encoding apparatus may determine applicability of affine prediction to a current block and availability of a temporal motion vector predictor based on a sub-block of the current block.

The encoding apparatus according to one embodiment may determine, based on the determination about applicability of the affine prediction to the current block and availability of the temporal motion vector predictor based on the sub-block of the current block, whether to encode a predetermined merge mode flag indicating whether to apply a predetermined merge mode to the current block S410. More specifically, the predictor 220 of the encoding apparatus may determine, based on the determination about applicability of the affine prediction to the current block and availability of the temporal motion vector predictor based on the sub-block of the current block, whether to encode a predetermined merge mode flag indicating whether to apply a predetermined merge mode to the current block.

In one example, the predetermined merge mode may be a merge affine mode or a merge sub-block mode, and the predetermined merge mode flag may be a merge affine flag or a merge sub-block flag. The merge affine flag may be denoted by merge_affine_flag, and the merge sub-block flag may be denoted by merge_subblock_flag.

The encoding apparatus according to one embodiment may encode, based on the determination about whether to encode the predetermined merge mode flag, an affine flag indicating applicability of the affine prediction to the current block, a sub-block TMVP flag indicating availability of the temporal motion vector predictor based on the sub-block of the current block, and the predetermined merge mode flag S420. More specifically, the entropy encoder 240 of the encoding apparatus may encode, based on the determination about whether to encode the predetermined merge mode flag, an affine flag indicating applicability of the affine prediction to the current block, a sub-block TMVP flag indicating availability of the temporal motion vector predictor based on the sub-block of the current block, and the predetermined merge mode flag.

In one embodiment, when the value of the affine flag is 1 or the value of the sub-block TMVP flag is 1, it may be determined to encode the predetermined merge mode flag.

In one embodiment, when the width and the height of the current block are larger than or equal to 8, respectively, a first condition requiring that the value of the affine flag is 1 is satisfied, or a second condition requiring that the value of the sub-block TMVP flag is 1 is satisfied, it may be determined to encode the predetermined merge mode flag.

In one embodiment, whether to encode the predetermined merge mode flag may be determined by Eq. 1 below.

if(($sps\_affine\_enabled\_flag$ && $cb$Width>=8 && $cb$Height>=8) || $sps\_sbtmvp\_enabled\_flag$)  [Eq. 1]

In Eq. 1, sps_affine_enabled_flag may represent the affine flag, the cbWidth may represent the width of the current block, the cbHeight may represent the height of the current block, and the sps_sbtmvp_enabled_flag may represent the sub-block TMVP flag.

In one embodiment, the predetermined merge mode flag may be a merge affine flag indicating applicability of an affine merge mode to the current block or a merge sub-block flag indicating applicability of a merge mode to the current block in units of sub-blocks.

In one embodiment, when the maximum number of merge candidates of the sub-block of the current block is larger than 0, it may be determined to encode the predetermined merge mode flag.

In one embodiment, when the value of the affine flag is 1 or the value of the sub-block TMVP flag is 1, the maximum number of merge candidates of the sub-block of the current block may be larger than 0.

In one embodiment, whether to encode the predetermined merge mode flag may be determined based on Eq. 2.

if(MaxNumSubblockMergeCand>0 && $cb$Width>=8 && $cb$Height>=8)  [Eq. 2]

In Eq. 2, MaxNumSubblockMergeCand may represent the maximum number of merge candidates of the sub-block, the cbWidth may represent the width of the current block, and the cbHeight may represent the height of the current block.

According to the encoding apparatus and the method for operating the encoding apparatus of FIGS. 4 and 5, the encoding apparatus may determine applicability of affine prediction to a current block and availability of a temporal motion vector predictor based on a sub-block of the current block S400; determine, based on the determination about applicability of the affine prediction to the current block and availability of the temporal motion vector predictor based on the sub-block of the current block, whether to encode a predetermined merge mode flag indicating whether to apply a predetermined merge mode to the current block S410; and encode, based on the determination about whether to encode the predetermined merge mode flag, an affine flag indicating applicability of the affine prediction to the current block, a sub-block TMVP flag indicating availability of the temporal motion vector predictor based on the sub-block of the current block, and the predetermined merge mode flag S420, wherein, when the value of the affine flag is 1 or the value of the sub-block TMVP flag is 1, it is determined to encode the predetermined merge mode flag. In other words, image coding efficiency may be improved by determining whether to decode a predetermined merge mode flag indicating whether to apply a predetermined merge mode to a current block based on an affine flag and a sub-block TMVP flag.

FIG. 6 is a flow diagram illustrating an operation of a decoding apparatus according to one embodiment, and FIG. 7 illustrates a configuration of a decoding apparatus according to one embodiment.

The respective steps shown in FIG. 6 may be performed by the decoding apparatus 300 shown in FIG. 3. More specifically, S600 and S610 steps may be performed by the entropy decoder 310 disclosed in FIG. 3, and S630 step may be performed by the adder 340 disclosed in FIG. 3. Moreover, the operations according to the S600 to S630 steps are based on part of the descriptions given with reference to FIG. 3. Therefore, specific descriptions overlapping the details described with reference to FIG. 3 will be omitted or simplified.

As shown in FIG. 7, a decoding apparatus according to one embodiment may include an entropy decoder 310, a predictor 330, and an adder 340. However, depending on situations, not all of the constituting elements shown in FIG. 7 may be essential elements of the decoding apparatus, and the decoding apparatus may be implemented using a larger or smaller number of constituting elements than those shown in FIG. 7.

In the decoding apparatus according to one embodiment, the entropy decoder 310, the predictor 330, and the adder 340 may be implemented by the respective chips, or at least two or more constituting elements may be implemented using a single chip.

The decoding apparatus according to one embodiment may decode, based on a bitstream, an affine flag indicating applicability of affine prediction to a current block and a sub-block TMVP flag indicating availability of a temporal motion vector predictor based on a sub-block of the current block S600. More specifically, the entropy decoder 310 of the decoding apparatus may decode, based on a bitstream, an affine flag indicating applicability of affine prediction to a current block and a sub-block TMVP flag indicating availability of a temporal motion vector predictor based on a sub-block of the current block.

In one example, the affine flag may be denoted by sps_affine_enabled_flag, and the sub-block TMVP flag may be denoted by sps_sbtmvp_enabled_flag. The sub-block TMVP flag may be referred to as a sub-PU TMVP flag.

In one example, the affine flag and the sub-block TMVP flag may be signaled at the SPS level.

The decoding apparatus according to one embodiment may determine, based on the decoded affine flag and the decoded sub-block TMVP flag, whether to decode a predetermined merge mode flag indicating whether to apply a predetermined merge mode to the current block S610. More specifically, the entropy decoder 310 of the decoding apparatus may determine, based on the decoded affine flag and the decoded sub-block TMVP flag, whether to decode a predetermined merge mode flag indicating whether to apply a predetermined merge mode to the current block.

In one example, the predetermined merge mode may be a merge affine mode or a merge sub-block mode, and the predetermined merge mode flag may be a merge affine flag or a merge sub-block flag. The merge affine flag may be denoted by merge_affine_flag, and the merge sub-block flag may be denoted by merge_subblock_flag.

The decoding apparatus according to one embodiment may derive prediction samples for the current block based on the determination about whether to decode the predetermined merge mode flag S620. More specifically, the predictor 330 of the decoding apparatus may derive prediction samples for the current block based on the determination about whether to decode the predetermined merge mode flag.

The decoding apparatus according to one embodiment may derive a prediction mode to be applied to the current block based on the determination about whether to decode the predetermined merge mode flag and derive prediction samples for the current block based on the derived prediction mode.

The decoding apparatus according to one embodiment may generate reconstructed samples for the current block based on the prediction samples for the current block S630. More specifically, the adder 340 of the decoding apparatus may generate reconstructed samples for the current block based on the prediction samples for the current block.

In one embodiment, when the value of the affine flag is 1 or the value of the sub-block TMVP flag is 1, it may be determined to decode the predetermined merge mode flag.

In one example, when the value of sps_affine_enabled_flag is 1 or the value of sps_sbtmvp_enabled_flag is 1, it may be determined to decode the predetermined merge mode flag.

In another example, when the value of sps_affine_enabled_flag is 1 or the value of sps_sbtmvp_enabled_flag is 1, it may be determined to decode a merge affine flag (merge_affine_flag).

In yet another example, when the value of sps_affine_enabled_flag is 1 or the value of sps_sbtmvp_enabled_flag is 1, it may be determined to decode a merge sub-block flag (merge_subblock_flag).

In one embodiment, when the width and the height of the current block are larger than or equal to 8, respectively, a first condition requiring that the value of the affine flag is 1 is satisfied, or a second condition requiring that the value of the sub-block TMVP flag is 1 is satisfied, it may be determined to decode the predetermined merge mode flag.

In one embodiment, whether to decode the predetermined merge mode flag may be determined based on Eq. 3 below.

if((sps_affine_enabled_flag&&cbWidth>=8&&cbHeight>=8)||sps_sbtmvp_enabled_flag) [Eq. 3]

In Eq. 3, sps_affine_enabled_flag may represent the affine flag, the cbWidth may represent the width of the current block, the cbHeight may represent the height of the current block, and the sps_sbtmvp_enabled_flag may represent the sub-block TMVP flag.

In one embodiment, when the maximum number of merge candidates of the sub-block of the current block is larger than 0, it may be determined to decode the predetermined merge mode flag.

In one embodiment, when the value of the affine flag is 1 or the value of the sub-block TMVP flag is 1, the maximum number of merge candidates of the sub-block of the current block may be larger than 0.

In one embodiment, whether to decode the predetermined merge mode flag may be determined based on Eq. 4.

if(MaxNumSubblockMergeCand>0&&cbWidth>=8&&cbHeight>=8) [Eq. 4]

In Eq. 4, MaxNumSubblockMergeCand may represent the maximum number of merge candidates of the sub-block, the cbWidth may represent the width of the current block, and the cbHeight may represent the height of the current block.

According to the decoding apparatus and the method for operating the decoding apparatus of FIGS. 6 and 7, the decoding apparatus may decode, based on a bitstream, an affine flag indicating applicability of affine prediction to a current block and a sub-block TMVP flag indicating availability of a temporal motion vector predictor based on a sub-block of the current block S600; determine, based on the decoded affine flag and the decoded sub-block TMVP flag, whether to decode a predetermined merge mode flag indicating whether to apply a predetermined merge mode to the current block S610; derive prediction samples for the current block based on the determination about whether to decode the predetermined merge mode flag S620; and generate reconstructed samples for the current block based on the prediction samples for the current block S630, wherein, when the value of the affine flag is 1 or the value of the sub-block TMVP flag is 1, it is determined to decode the predetermined merge mode flag. In other words, image coding efficiency may be improved by determining whether to decode a predetermined merge mode flag indicating whether to apply a predetermined merge mode to a current block based on an affine flag and a sub-block TMVP flag.

In the above-described embodiment, the methods are described based on the flowchart having a series of steps or blocks, but the present disclosure is not limited to the order of the above steps or blocks and some steps may occur simultaneously or in a different order from other steps as described above. Further, those skilled in the art will understand that the steps shown in the above flowchart are not exclusive, that further steps may be included, or that one or more steps in the flowchart may be deleted without affecting the scope of the present disclosure.

The method according to the present disclosure described above may be implemented in software. The encoding apparatus and/or decoding apparatus according to the present disclosure may be included in a device that performs image processing, for example, a TV, a computer, a smartphone, a set-top box, or a display device.

When the embodiments of the present disclosure are implemented in software, the above-described method may be implemented by modules (processes, functions, and so on) that perform the functions described above. Such modules may be stored in memory and executed by a processor.

The memory may be internal or external to the processor, and the memory may be coupled to the processor using various well known means. The processor may include an application-specific integrated circuit (ASIC), other chipsets, a logic circuit and/or a data processing device. The memory may include a ROM (read-only memory), a RAM (random access memory), a flash memory, a memory card, a storage medium, and/or other storage device. That is, the embodiments described in the present disclosure may be implemented and performed on a processor, a microprocessor, a controller, or a chip. For example, the functional units shown in each drawing may be implemented and executed on a computer, a processor, a microprocessor, a controller, or a chip. In this case, information (ex. Information on instructions) for implementation or an algorithm may be stored in a digital storage medium.

In addition, the decoding apparatus and the encoding apparatus to which the present disclosure is applied may be applied to multimedia communication devices such as a multimedia broadcasting transmitting and receiving device, a mobile communication terminal, a home cinema video device, a digital cinema video device, a surveillance camera, a video chatting device, (3D) video devices, video telephony video devices, and medical video devices, and the like, which may be included in, for example, a storage medium, a camcorder, a video on demand (VoD) service provision device, an OTT video (Over the top video), an Internet streamlining service providing device, a 3D video device, a virtual reality (VR) device, an augmented reality (AR) device, a video call device, a transportation means terminal (e.g., vehicle (including autonomous vehicle) terminal, airplane terminal, ship terminal, etc.) and may be used to process video signals or data signals. For example, the OTT video (over the top video) device may include a game console, a Blu-ray player, an Internet access TV, a home theater system, a smartphone, a tablet PC, a digital video recorder (DVR).

Further, the processing method to which the present disclosure is applied may be produced in the form of a computer-executed program, and may be stored in a computer-readable recording medium. The multimedia data having the data structure according to the present disclosure may also be stored in a computer-readable recording medium. The computer-readable recording medium includes all kinds of storage devices and distributed storage devices in which computer-readable data is stored. The computer-readable recording medium may be, for example, a Blu-ray Disc (BD), a Universal Serial Bus (USB), a ROM, a PROM, an EPROM, an EEPROM, a RAM, a CD-ROM, magnetic tape, floppy disk, and optical data storage devices. In addition, the computer-readable recording medium includes media implemented in the form of a carrier wave (for example, transmission over the Internet). In addition, the bit stream generated by the encoding method may be stored in a computer-readable recording medium or transmitted over a wired or wireless communication network.

Further, an embodiment of the present disclosure may be implemented as a computer program product by program code, and the program code may be executed in a computer according to an embodiment of the present disclosure. The program code may be stored on a carrier readable by a computer.

Figure 8:
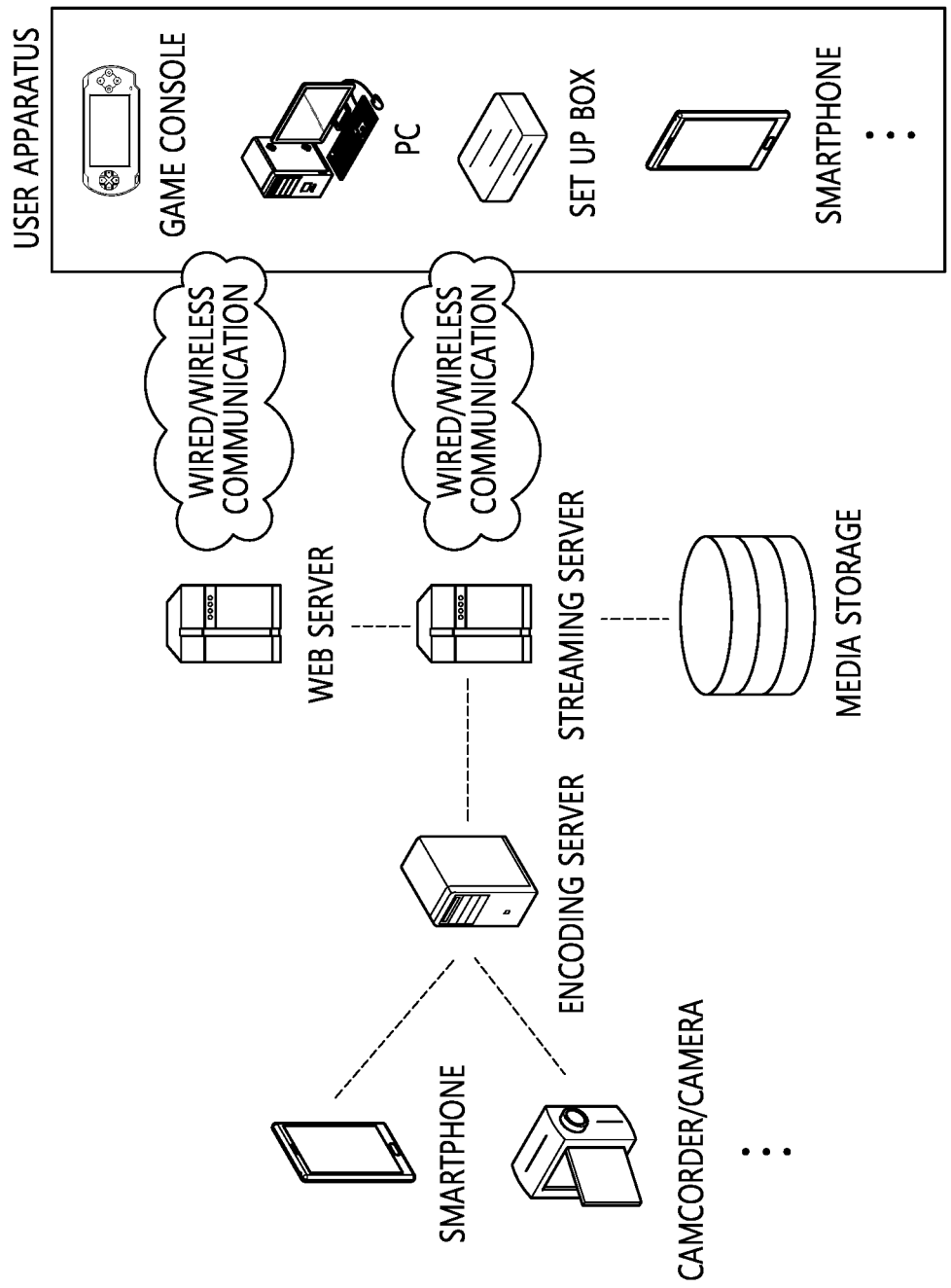
FIG. 8 illustrates an example of a contents streaming system to which the present disclosure may be applied.

FIG. 8 is a diagram illustrating a structure of a content streaming system.

Referring to FIG. 8, the content streaming system to which the present disclosure is applied may largely include an encoding server, a streaming server, a web server, a media storage, a user device, and a multimedia input device.

The encoding server serves to compress the content input from the multimedia input devices such as a smartphone, a camera, and a camcorder into the digital data to generate a bitstream and transmit the bitstream to the streaming server. As another example, if the multimedia input devices such as a smartphone, a camera, and a camcorder directly generate the bitstream, the encoding server may be omitted.

The bitstream may be generated by the encoding method to which the present disclosure is applied or the bitstream generation method, and the streaming server may temporarily store the bitstream in the process of transmitting or receiving the bitstream.

The streaming server serves to transmit the multimedia data to the user device based on the user request through the web server, and the web server serves as a medium which informs the user of what services are available. When the user requests the desired service to the web server, the web server delivers the user's request to the streaming server, and the streaming server transmits the multimedia data to the user. At this time, the content streaming system may include a separate control server, and in this case, the control server serves to control commands/responses between the devices within the content streaming system.

The streaming server may receive the contents from the media storage and/or the encoding server. For example, when receiving the contents from the encoding server, the streaming server may receive the contents in real time. In this case, to provide the smooth streaming service, the streaming server may store the bitstream for a predetermined time.

As an example of the user device, there may be a portable phone, a smartphone, a laptop computer, a digital broadcast terminal, a personal digital assistants (PDA), a portable multimedia player (PMP), a navigation device, a slate PC, a tablet PC, an ultrabook, a wearable device (e.g., a smart watch, a smart glass, a head mounted display (HMD)), a digital TV, a desktop computer, a digital signage, or the like.

The respective servers within the content streaming system may be operated by a distribution server, and in this case, the data received by each server may be distributed and processed.

What is claimed is:
1. An image decoding method performed by a decoding apparatus, the method comprising:
 receiving affine enabled flag information and sub-block temporal motion vector prediction enabled flag information through a bitstream;
 determining whether to receive specific flag information related to whether a sub-block based specific merge mode is applied to a current block;
 receiving the specific flag information based on the determination;
 checking whether to receive a specific merge index for the sub-block based specific merge mode based on the specific flag information, the affine enabled flag information and the sub-block temporal motion vector prediction enabled flag information;
 deriving a prediction mode of the current block based on the result of the determination;
 deriving prediction samples for the current block by applying inter prediction to the current block based on the derived prediction mode; and
 generating reconstructed samples based on the prediction samples, wherein the determining whether to receive the specific flag information is performed based on at least one of the affine enabled flag information and the sub-block temporal motion vector prediction enabled flag information, and wherein based on a case that a value of the specific flag information is equal to 1, a value of the affine enabled flag information is equal to 0 and a value of the sub-block temporal motion vector prediction enabled flag information is equal to 1, it is checked that the specific merge index is not received.

2. The method of claim 1, wherein based on a case that the value of the affine enabled flag information is equal to 0 and the value of the sub-block temporal motion vector prediction enabled flag information is equal to 1, it is determined that the specific flag information is received.

3. The method of claim 1, wherein based on a case that the value of the affine enabled flag information is equal to 1 and a width and a height of the current block are greater than or equal to 8, it is determined that the specific flag information is received.

4. The method of claim 1, wherein determining whether the specific flag information is received is performed based on the following equation:

$$((sps\_\text{affine\_enabled\_flag} \:\&\&\: cb\text{Width}{>}{=}8 \:\&\&\: cb\text{Height}{>}{=}8) || sps\_\text{sbtmvp\_enabled\_flag}),$$

where sps_affine_enabled_flag represents the affine enabled flag information, sps_sbtmvp_enabled_flag represents the sub-block temporal motion vector prediction enabled flag information, and cbWidth and cbHeight represent a width and a height of the current block, respectively.

5. The method of claim 1, wherein the sub-block based specific merge mode is an affine merge mode or a sub-block based merge mode.

6. The method of claim 1, further comprising:
deriving a value of the specific merge index based on the result of the checking, and
wherein based on a case that it is checked that the specific merge index is not received, the value of the specific merge index is derived as to 0.

7. The method of claim 6, further comprising:
deriving a maximum number of merge candidates for the specific merge mode,
wherein based on a case that the value of the affine enabled flag information is equal to 1 and a value of maximum number of merge candidates for the specific merge mode is greater than 1, it is checked that the specific merge index is received.

8. An image encoding method performed by an encoding apparatus, the method comprising:
deriving affine enabled flag information and sub-block temporal motion vector prediction enabled flag information;
determining whether to signal specific flag information related to whether a sub-block based specific merge mode is applied to a current block;
deriving the specific flag information based on the determination;
checking whether to signal a specific merge index for the sub-block based specific merge mode based on the specific flag information, the affine enabled flag information and the sub-block temporal motion vector prediction enabled flag information; and
encoding image information including at least one of the affine enabled flag information, the sub-block temporal motion vector prediction enabled flag information, the specific flag information, or the specific merge index, wherein the determining whether to signal the specific flag information is performed based on at least one of the affine enabled flag information and the sub-block temporal motion vector prediction enabled flag information, and wherein based on a case that a value of the specific flag information is equal to 1, a value of the affine enabled flag information is equal to 0 and the value of the sub-block temporal motion vector prediction enabled flag information is equal to 1, it is checked that the specific merge index is not signaled.

9. The method of claim 8, wherein based on a case that the value of the affine enabled flag information is equal to 0 and the value of the sub-block temporal motion vector prediction enabled flag information is equal to 1, it is determined that the specific flag information is signaled.

10. The method of claim 8, wherein based on a case that the value of the affine enabled flag information is equal to 1 and a width and a height of the current block are greater than or equal to 8, it is determined that the specific flag information is signaled.

11. The method of claim 8, wherein determining whether the specific flag information is signaled is performed based on the following equation:

$$((sps\_\text{affine\_enabled\_flag} \:\&\&\: cb\text{Width}{>}{=}8 \:\&\&\: cb\text{Height}{>}{=}8) || sps\_\text{sbtmvp\_enabled\_flag}),$$

where sps_affine_enabled_flag represents the affine enabled flag information, sps_sbtmvp_enabled_flag represents the sub-block temporal motion vector prediction enabled flag information, and cbWidth and cbHeight represent a width and a height of the current block, respectively.

12. The method of claim 8, wherein the sub-block based specific merge mode is an affine merge mode or a sub-block based merge mode.

13. The method of claim 8, wherein a value of the specific merge index is represented based on the result of the checking, and
wherein based on a case that it is checked that the specific merge index is not signaled, the value of the specific merge index is represented as to 0.

14. The method of claim 13, further comprising:
deriving a maximum number of merge candidates for the specific merge mode,
wherein based on a case that the value of the affine enabled flag information is equal to 1 and a value of maximum number of merge candidates for the specific merge mode is greater than 1, it is checked that the specific merge index information is signaled.

15. A non-transitory computer-readable storage medium storing a bitstream generated by a method, the method comprising:
deriving affine enabled flag information and sub-block temporal motion vector prediction enabled flag information;
determining whether to signal specific flag information related to whether a sub-block based specific merge mode is applied to a current block;
deriving the specific flag information based on the determination;
checking whether to signal a specific merge index for the sub-block based specific merge mode based on the specific flag information, the affine enabled flag information and the sub-block temporal motion vector prediction enabled flag information; and generating the bitstream by encoding image information including at least one of the affine enabled flag information, the sub-block temporal motion vector prediction enabled flag information, the specific flag information, or the specific merge index, wherein the determining whether to signal the specific flag information is performed based on at least one of the affine enabled flag information and the sub-block temporal motion vector prediction enabled flag information, and wherein based on a case that a value of the specific flag information is equal to 1, a value of the affine enabled flag information is equal to 0 and a value of the sub-block temporal motion vector prediction enabled flag information is equal to 1, it is checked that the specific merge index is not signaled.

16. The non-transitory computer-readable storage medium of claim 15, wherein based on a case that the value of the affine enabled flag information is equal to 0 and the value of the sub-block temporal motion vector prediction enabled flag information is equal to 1, it is determined that the specific flag information is signaled.

17. The non-transitory computer-readable storage medium of claim 15, wherein a value of the specific merge index is represented based on the result of the checking, and wherein based on a case that it is checked that the specific merge index is not signaled, the value of the specific merge index is represented as to 0.

18. The non-transitory computer-readable storage medium of claim 15, wherein based on a case that the value of the affine enabled flag information is equal to 1 and a width and a height of the current block are greater than or equal to 8, it is determined that the specific flag information is signaled.

19. The non-transitory computer-readable storage medium of claim 15, wherein determining whether the specific flag information is signaled is performed based on the following equation:

$$((sps\_affine\_enabled\_flag \,\&\&\, cbWidth{>}{=}8 \,\&\&\, cbHeight{>}{=}8)||sps\_sbtmvp\_enabled\_flag),$$

where sps_affine_enabled_flag represents the affine enabled flag information, sps_sbtmvp_enabled_flag represents the sub-block temporal motion vector prediction enabled flag information, and cbWidth and cbHeight represent a width and a height of the current block, respectively.

20. The non-transitory computer-readable storage medium of claim 15, wherein the sub-block based specific merge mode is an affine merge mode or a sub-block based merge mode.

* * * * *